No. 641,073. Patented Jan. 9, 1900.
A. BROTT.
REVERSING GEAR.
(Application filed Sept. 29, 1899.)
(No Model.)

WITNESSES:
Edward Thorpe
[signature]

INVENTOR
A. Brott
BY
[signature]
ATTORNEYS

THE NORRIS PETERS CO., PHOTO-LITHO., WASHINGTON, D. C.

UNITED STATES PATENT OFFICE.

ANDREW BROTT, OF SOUTH DENVER, COLORADO.

REVERSING-GEAR.

SPECIFICATION forming part of Letters Patent No. 641,073, dated January 9, 1900.

Application filed September 29, 1899. Serial No. 732,042. (No model.)

*To all whom it may concern:*

Be it known that I, ANDREW BROTT, of South Denver, in the county of Arapahoe and State of Colorado, have invented a new and Improved Reversing-Gear, of which the following is a full, clear, and exact description.

The object of the invention is to provide a new and improved reversing-gear arranged to permit of conveniently and quickly reversing a shaft from a pulley continuously driven in one direction and which is simple and durable in construction, composed of comparatively few parts, and hence not liable to get out of order.

The invention consists of novel features and parts and combinations of the same, as will be fully described hereinafter, and then pointed out in the claims.

A practical embodiment of my invention is represented in the accompanying drawings, forming a part of this specification, in which similar characters of reference indicate corresponding parts in all the views.

Figure 2:
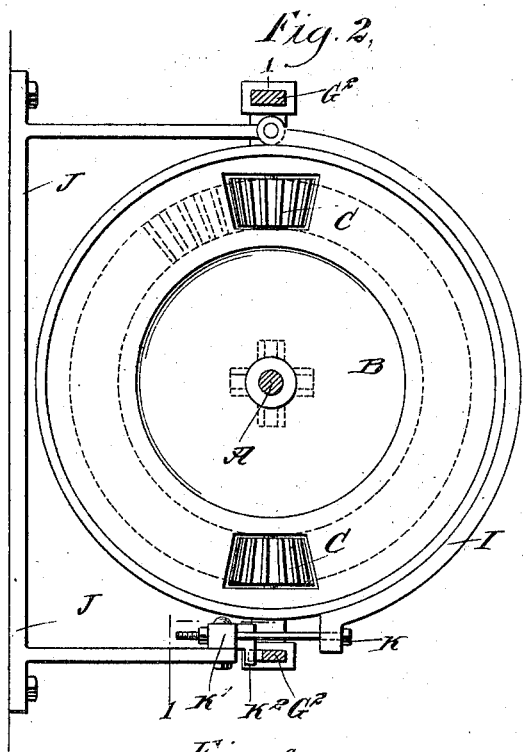
Figure 1:
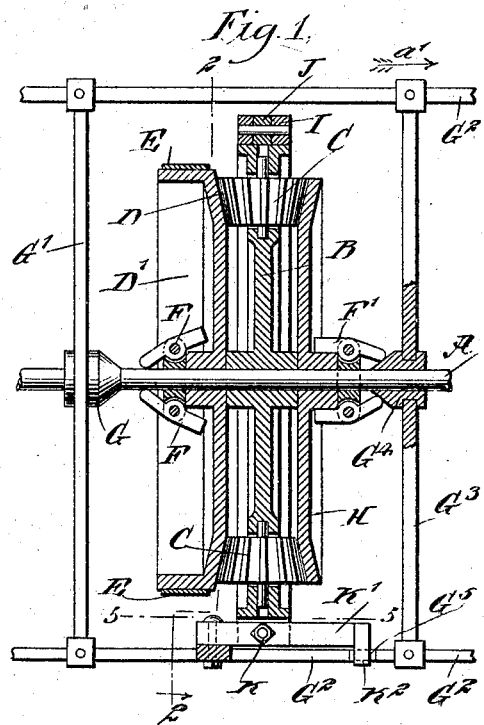
Figure 4:
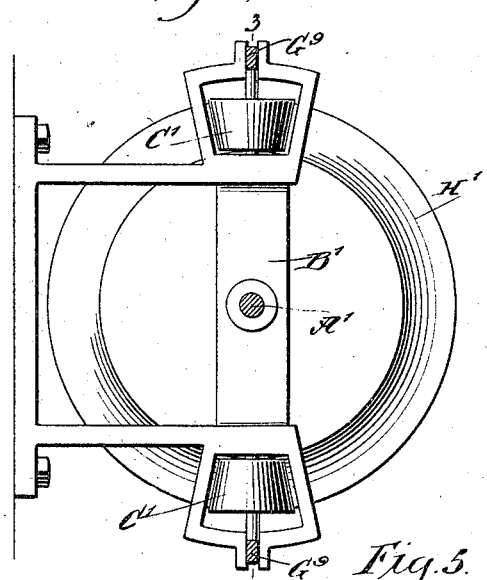
Figure 3:
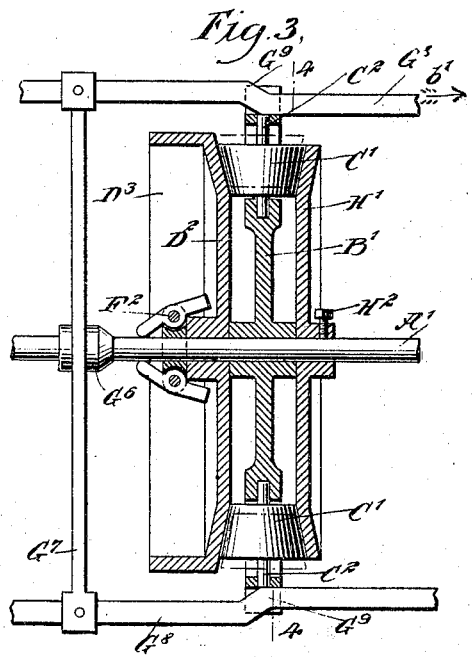
Figure 5:
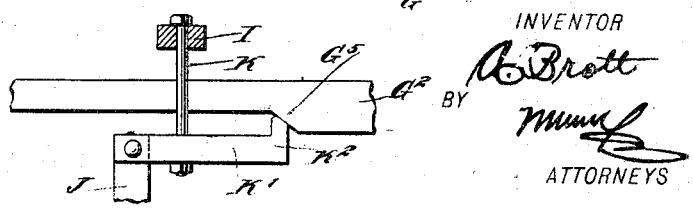

Figure 1 is a sectional side elevation of the improvement on the line 1 1 of Fig. 2. Fig. 2 is a transverse section of the same on the line 2 2 in Fig. 1. Fig. 3 is a sectional side elevation of a modified form of the improvement arranged with friction-wheels, the section being on the line 3 3 of Fig. 4. Fig. 4 is a transverse section of the same on the line 4 4 in Fig. 3; and Fig. 5 is an enlarged plan view, with part in section, of the band-brake.

The improved reversing-gear illustrated in Figs. 1 and 2 is applied to a shaft A to be driven in a forward or a reverse direction, and on said shaft A is mounted loosely a wheel or other support B, in which is radially journaled one or a plurality of bevel-pinions C, in mesh on one side with a bevel gear-wheel D, secured to or formed on a pulley D', connected by a belt E with other machinery for imparting a continuous rotary motion to the said pulley and the bevel gear-wheel D in one direction. The bevel gear-wheel D is mounted to rotate loosely on the shaft A and is adapted to be coupled thereto by a clutch F, the pivoted members of which are adapted to be swung in frictional contact with the hub of the wheel D by a cone G, fitted to slide loosely on the shaft A and carried by a bar G', to which are secured shifting-arms $G^2$ under the control of the operator. On the arms $G^2$ is also held an arm $G^3$, carrying a cone $G^4$ for throwing the pivoted members of a clutch F' in contact with the hub of a second gear-wheel H, likewise mounted to rotate loosely on the shaft A and in mesh with the pinion C on the side opposite to that in mesh with the gear-wheel D. The wheel or support B is adapted to be locked against rotation by a band-brake having a brake-band I engaging a part of the rim of the wheel and secured at its upper end to a bracket J and at its lower end to a screw-rod K, held on an arm K', pivoted to the bracket J. (See Figs. 1, 2, and 5.) The arm K' is provided on its free end with a lug $K^2$, adapted to be engaged by an inclined or beveled shoulder $G^5$ on the lower arm $G^2$, so that when this arm is moved to the left the shoulder $G^5$ imparts a swinging motion to the arm K' to draw the band I tight on the rim of the wheel B, thus braking the latter at the time the cone G is out of mesh with the clutch F, and the other cone $G^4$ actuates the clutch F' to lock the wheel H to the shaft A by the said clutch F'. When the shifting-arms $G^2$ are moved in the direction of the arrow $a'$, then the shoulder $G^5$ is moved from the lug $K^2$ and the brake-band I is released and the cone $G^4$ moves out of engagement with the clutch F' to disconnect the wheel H from the shaft A, and at the same time the cone G is moved in engagement with the clutch F, so as to lock the gear-wheel D and its pulley D' to the shaft A. Now when the several parts are in this position then the rotary motion of the pulley D' and gear-wheel D is transmitted direct by the clutch F to the shaft A to rotate the latter in a forward direction, and as the wheel H is now disconnected from the shaft A it is evident that the pinion C and the said wheel H rotate loosely without transmitting motion or influencing the shaft A in any way whatever. When, however, the operator moves the arms $G^2$ in the inverse direction of the arrow $a'$ to the position shown in Figs. 1 and 2, then the support B is held against rotation and the wheel D is free to rotate loosely on the shaft A, while the wheel H is locked to the shaft. The rotating motion given to the pulley D' is transmitted by the gear-wheel D to the pinion C, and the latter now rotates the gear-wheel H, and with it the shaft A, but in a reverse direction from that previously given to the said shaft A, as above described.

In the arrangement shown in Figs. 3 and 4 the wheels D² and H' are in frictional contact with opposite sides of the friction-pinions C', having their shafts C² free to slide radially in bearings in the support B' in the form of a bracket fixed to a wall or the like. The wheel H' is secured by a set-screw H² to the shaft A', while the wheel D³ is provided with a pulley D³ and is adapted to be locked to the shaft A' by a clutch F², opened or closed by the cone G⁶, held on the bar G⁷, attached to the sliding arms G⁸. The latter are provided with shoulders or inclines G⁹, adapted to engage slots in the outer ends of the support B' to lock the shafts C² in an innermost position and hold the pinions C' in frictional contact with both wheels H' and D² at the time the wheel D² rotates loosely on the shaft A by being disconnected from the same by the clutch F². (See Fig. 3.) When, however, the arms G⁸ are moved to the right in the direction of the arrow b', then the shoulders or inclines G⁹ move out of engagement with the shafts C² for the pinions C' to allow the latter to slide outward with their shafts and move out of frictional engagement with the wheels H' and D². When this takes place, the cone G⁶ actuates the clutch F², so as to lock the wheel D² to the shaft A', and consequently the rotating motion of the wheel D² is transmitted by the shaft A' in a forward direction. When the several parts are, however, in the position shown in Fig. 3, then the rotation of the wheel D² causes a revolving of the pinion C' and the wheel H' to rotate the shaft A' in a reverse direction.

The device is very simple and durable in construction, is not liable to get out of order, and is positive in its operation.

Having thus fully described my invention, I claim as new and desire to secure by Letters Patent—

1. A reversing-gear, comprising two bevel-wheels arranged for connection with the shaft to be driven in a forward or backward direction, one of the wheels being driven, a supporting-wheel loose on the shaft and carrying a bevel-pinion for meshing with both wheels on opposite sides of the pinion, a clutch adapted to connect the driven wheel with the shaft, a brake adapted to engage the said support to lock the same, said brake being provided with an actuating-arm, a cone adapted to actuate said clutch, and a shifting-arm for said cone, said arm having a shoulder engaging and moving the actuating-arm for the brake when the cone is shifted in one direction as set forth.

2. In a reversing-gear, the combination with a shaft, two bevel-wheels both loosely mounted on said shaft, a support loose on said shaft and carrying a pinion meshing with said wheels, clutches on opposite sides of said wheels, cones slidable on said shafts and adapted to actuate said clutches, and shifting-arms connected together and connected with said cones, whereby one clutch will be coupled to the adjacent wheel and the other uncoupled from its adjacent wheel at the same time, as set forth.

3. In a reversing-gear, the combination with a shaft to be driven, a support normally loose on the shaft and carrying a radially-disposed bevel-pinion, and bevel gear-wheels mounted to rotate loosely on the shaft and in mesh with opposite sides of said pinion, one of the gear-wheels being driven, of connected clutches on the shaft and adapted to engage said gear-wheels, clutch-actuating means under the control of the operator for throwing one clutch into engagement with its wheel and the other out of engagement with its wheel, and a brake mechanism controlled by the said clutch-actuating means and engaging the said support for the bevel-pinion, substantially as shown and described.

4. In a reversing-gear, the combination with a shaft to be driven, a support held on the shaft and carrying a radially-disposed bevel-pinion, and bevel gear-wheels mounted to rotate loosely on the shaft and in mesh with opposite sides of said pinion, one of the gear-wheels being driven, of clutches connected to move together on the shaft, and adapted to engage said gear-wheels, and clutch-actuating means under the control of the operator for throwing one clutch into engagement with its wheel and the other out of engagement with its wheel, substantially as shown and described.

5. A reversing-gear, comprising a shaft to be driven, a support held on the shaft and carrying a radially-disposed bevel-pinion, bevel gear-wheels mounted to rotate loosely on the shaft and in mesh with opposite side of said pinion, one of the gear-wheels being driven, connected clutches on the shaft, and adapted to engage said gear-wheels, clutch-actuating means under the control of the operator, for throwing one clutch into engagement with its wheel and the other out of engagement with its wheel, a device for braking said pinion-support, and a connection between said braking device and said clutch-actuating means whereby the latter serves to hold the support against rotation when in one position, as set forth.

6. A reversing-gear, comprising two bevel-wheels, on the shaft to be driven in a forward or backward direction, one of the wheels being driven, a support on said shaft, said support carrying a bevel-pinion for meshing with both wheels on opposite sides of the pinion, means for holding said support rigid, a clutch adapted to connect the driven wheel with the shaft, shifting-arms arranged to throw said driven wheel into gear with the other bevel-wheel, and a connection between said shifting-arms and the clutch for coupling the driven wheel to the shaft whereby said clutch is thrown out of action when the two bevel-wheels are thrown into gear, as set forth.

ANDREW BROTT.

Witnesses:
R. D. REES,
A. BERGER.